US012291129B2

(12) United States Patent
Lee et al.

(10) Patent No.: US 12,291,129 B2
(45) Date of Patent: May 6, 2025

(54) DEVICE FOR ASSEMBLING RECLINING SEAT OF VEHICLE

(71) Applicants: Hyundai Motor Company, Seoul (KR); Kia Corporation, Seoul (KR)

(72) Inventors: Ji Sun Lee, Gyeonggi-do (KR); Sung Hak Hong, Gyeonggi-do (KR); Soo Hyun Moon, Gyeonggi-do (KR); Jun Yong Kim, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 332 days.

(21) Appl. No.: 17/949,543

(22) Filed: Sep. 21, 2022

(65) Prior Publication Data
US 2023/0100240 A1      Mar. 30, 2023

(30) Foreign Application Priority Data
Sep. 24, 2021   (KR) .................. 10-2021-0126206

(51) Int. Cl.
*B60N 2/015*     (2006.01)
*B60N 2/20*      (2006.01)
(52) U.S. Cl.
CPC ............. *B60N 2/015* (2013.01); *B60N 2/20* (2013.01)
(58) Field of Classification Search
CPC .. B60N 2/015; B60N 2/0155; B60N 2/01516; B60N 2/01525; B60N 2/01508; A47C 1/024; A61G 5/1067

USPC ....................................................... 297/354.1
See application file for complete search history.

(56) References Cited

U.S. PATENT DOCUMENTS

| 2,327,003 | A | * | 8/1943 | Turner ............... | B60N 2/01516 |
| | | | | | 248/502 |
| 2013/0292985 | A1 | * | 11/2013 | Pleskot ............... | B60N 2/2356 |
| | | | | | 297/354.12 |
| 2015/0091355 | A1 | * | 4/2015 | Kitou ...................... | B60N 2/68 |
| | | | | | 297/354.12 |
| 2019/0092479 | A1 | * | 3/2019 | Gross ................... | B60N 2/3097 |
| 2019/0308736 | A1 | * | 10/2019 | Gross ................. | B64D 11/0696 |
| 2019/0329907 | A1 | * | 10/2019 | Benthien ............ | B60N 2/01516 |
| 2020/0180769 | A1 | * | 6/2020 | Doughty ............ | B64D 11/0696 |
| 2020/0269725 | A1 | * | 8/2020 | Williams ........... | B60N 2/01516 |
| 2021/0155127 | A1 | * | 5/2021 | Last ........................ | B60N 2/005 |
| 2021/0221519 | A1 | * | 7/2021 | Gilbert ............... | B64D 11/0696 |
| 2024/0025550 | A1 | * | 1/2024 | Marutzky .......... | B64D 11/0696 |

FOREIGN PATENT DOCUMENTS

JP        2002039132 A  *  2/2002  ......... B60N 2/01508

* cited by examiner

*Primary Examiner* — Jose V Chen
(74) *Attorney, Agent, or Firm* — Fox Rothschild LLP

(57) ABSTRACT

The present disclosure provides a reclining seat assembly device for a vehicle in which a guide pin mounted on a mounting frame of a leg unit is inserted into a guide hole formed in a floor panel so as to be prevented from being separated from the guide hole during reclining of a seatback, whereby the reclining seat is prevented from deviating from a predetermined position on the floor panel and subsequent processes for assembling the reclining seat can be smoothly carried out.

17 Claims, 4 Drawing Sheets

DEVICE FOR ASSEMBLING RECLINING SEAT OF VEHICLE

CROSS-REFERENCE TO RELATED APPLICATION

This application is based on and claims under 35 U.S.C. § 119(a) the benefit of Korean Patent Application No. 10-2021-0126206, filed on Sep. 24, 2021, the entire contents of which are incorporated herein by reference.

TECHNICAL FIELD

The present disclosure relates to a device for assembling a reclining seat for a vehicle. More particularly, it relates to a reclining seat assembly device for a vehicle in which the reclining seat is stably fixed at a predetermined position on a floor panel to allow subsequent processes for assembling the reclining seat to be smoothly carried out.

BACKGROUND

Generally, for a seat in a second or third row in a vehicle, a reclining seat with a seatback that is foldable onto a seat cushion to secure more luggage space or is reclinable rearwards for a comfortable passenger position is adopted.

Here, a conventional structure and process for assembling the reclining seat are as follows.

First, a seat assembly in a state in which a seatback is folded onto a leg unit is provided.

Here, the leg unit includes a support frame for mounting a seat cushion thereon and a mounting frame mounted to a floor panel in an interior of a vehicle.

Next, the seat assembly is disposed at a predetermined position on the floor panel (a position at which the seat assembly is mounted).

Here, when a guide pin mounted on a mounting frame of the leg unit is inserted in a guide hole formed in the floor panel, the seat assembly is placed at the predetermined position on the floor panel and is primarily temporarily assembled thereto.

Next, the seatback folded on the leg unit is reclined to be erected.

That is, a worker manipulates a recliner lever provided on a side portion of the seat assembly in an unlocking direction to recline the seatback.

Here, since the seatback folded on the leg unit covers a mounting hole formed in the mounting frame of the leg unit, the seatback is reclined to allow the worker to easily access the mounting hole with a tool.

Then, the worker inserts a bolt or the like into the floor panel through the mounting hole in the mounting frame and fastens the bolt or the like to the floor panel, whereby the leg unit is assembled to the floor panel.

Finally, a seat cushion on which a passenger is seated is assembled on the support frame of the leg unit.

However, in the conventional process of assembling the reclining seat described above, the following problems occur.

In the state in which the guide pin mounted on the mounting frame of the leg unit is inserted into the guide hole formed in the floor panel so as to be temporarily assembled thereto, the leg unit is moved together with the seatback and lifted upwards when manipulating the recliner lever in the unlocking direction to recline the seatback rearwards, and thus the guide pin in the mounting frame escapes from the guide hole in the floor panel, causing the seat assembly to deviate from the predetermined position on the floor panel (the position where the seat assembly is mounted).

In other words, when manipulating the recliner lever in the unlocking direction to recline the seatback rearwards, the leg unit is moved together with the seatback and lifted upwards, and thus the guide pin in the mounting frame easily escapes from the guide hole in the floor panel, causing the seat assembly to deviate from the predetermined position on the floor panel (the position where the seat assembly is mounted).

Accordingly, the process of inserting the guide pin of the mounting frame into the guide hole in the floor panel is carried out again in order to fix the seat assembly at the predetermined position on the floor panel (the position at which the seat assembly is mounted), and, as such, labor for assembling the reclining seat is increased and assembly workability is greatly reduced.

The above information disclosed in this Background section is only for enhancement of understanding of the background of the disclosure and therefore it may contain information that does not form the existing technology that is already known in this country to a person of ordinary skill in the art.

SUMMARY

The present disclosure has been made in an effort to solve the above-described problems associated with the existing technology, and it is an object of the present disclosure to provide a reclining seat assembly device for a vehicle in which a guide pin mounted on a mounting frame of a leg unit is inserted into a guide hole formed in a floor panel so as to be prevented from being separated from the guide hole during reclining of a seatback, thereby preventing the reclining seat from deviating from a predetermined position on the floor panel and allowing subsequent processes for assembling the reclining seat to be smoothly carried out.

In one aspect, a reclining seat assembly for a vehicle is provided, the seat assembly comprising: a) a leg unit comprising a support frame for mounting a seat cushion and a mounting frame, b) a seatback reclinably connected to the leg unit, and c) a guide clip comprising a locking structure. In certain aspects, the guide clip is configured to be mounted in a guide hole in a vehicle floor panel. In certain aspects, the assembly suitably further comprises a guide pin inserted into the guide clip to allow the guide pin to be locked by the locking structure. In certain aspects, the guide pin may be suitably may be mounted to a mounting frame.

In one embodiment, the present disclosure provides a reclining seat assembly device for a vehicle configured to assemble, to a floor panel, a seat assembly including a leg unit including a support frame for mounting of a seat cushion and a mounting frame, and a seatback reclinably connected to the leg unit, wherein a guide clip provided with a locking structure may be mounted in a guide hole in the floor panel, and a guide pin mounted to the mounting frame may be inserted into the guide clip to allow the guide pin to be locked by the locking structure.

In a preferred embodiment, the guide clip may include a guide pipe provided in a configuration in which the locking structure is formed on an inner surface of the guide pipe so as to be inserted into the guide hole in the floor panel, and a flange integrally formed with a front end portion of the guide pipe so as to be caught by an upper surface portion of the floor panel and seated thereon.

In another preferred embodiment, the locking structure may be formed in a sawtooth-shaped structure protruding downwards from the inner surface of the guide pipe so as to be closely adhered to an outer surface of the guide pin.

In another preferred embodiment, when the guide pipe of the guide clip is inserted into the guide hole in the floor panel, the escape prevention protrusion may be closely adhered to the inner surface of the guiding hole so as to be locked thereto.

In still another preferred embodiment, the outer surface of the guide pin may be covered by a heat-shrink tube onto which the locking structure is press-fitted and thus locked.

In yet another preferred embodiment, an outer surface of the guide pipe may be formed with an escape prevention protrusion to be compressed on an inner surface of the guide hole in the floor panel.

In still yet another preferred embodiment, the mounting frame may be further provided with a washer member mounted on a lower surface thereof, the washer member having therein a through hole that matches a mounting hole in the mounting frame and a fixing hole formed to be separated from the through hole by a predetermined distance and into which the guide pin is fixedly inserted.

In a further preferred embodiment, a circumferential surface of a head of the guide pin may be formed with a fixing groove, into which an inner circumferential end portion of the fixing hole in the washer member is inserted.

In another further preferred embodiment, the mounting hole may be covered by a mounting cover after the floor panel is bolted through the mounting hole and the through hole in the mounting frame.

In another further preferred embodiment, the flange may be integrally formed with a front end portion of the guide pipe.

In another further preferred embodiment, the seat cushion may be assembled on the support frame.

In another further preferred embodiment, a recliner lever is configured to fold or recline the seatback is mounted on a side portion of the seatback.

In another further preferred embodiment, the guide clip is made of a plastic material.

Other embodiments and preferred embodiments of the disclosure are discussed infra.

It is to be understood that the term "vehicle" or "vehicular" or other similar term as used herein is inclusive of motor vehicles in general, such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example, vehicles powered by both gasoline and electricity.

In another embodiment, vehicles are provided that comprise an apparatus as disclosed herein.

In one aspect, a vehicle is provided that comprises a reclining seat assembly for a vehicle, the seat assembly comprising: a) a leg unit comprising a support frame for mounting a seat cushion and a mounting frame, b) a seatback reclinably connected to the leg unit, and c) a guide clip comprising a locking structure, the guide clip mounted in a guide hole in a vehicle floor panel; and d) a guide pin inserted into the guide clip to allow the guide pin to be locked by the locking structure.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
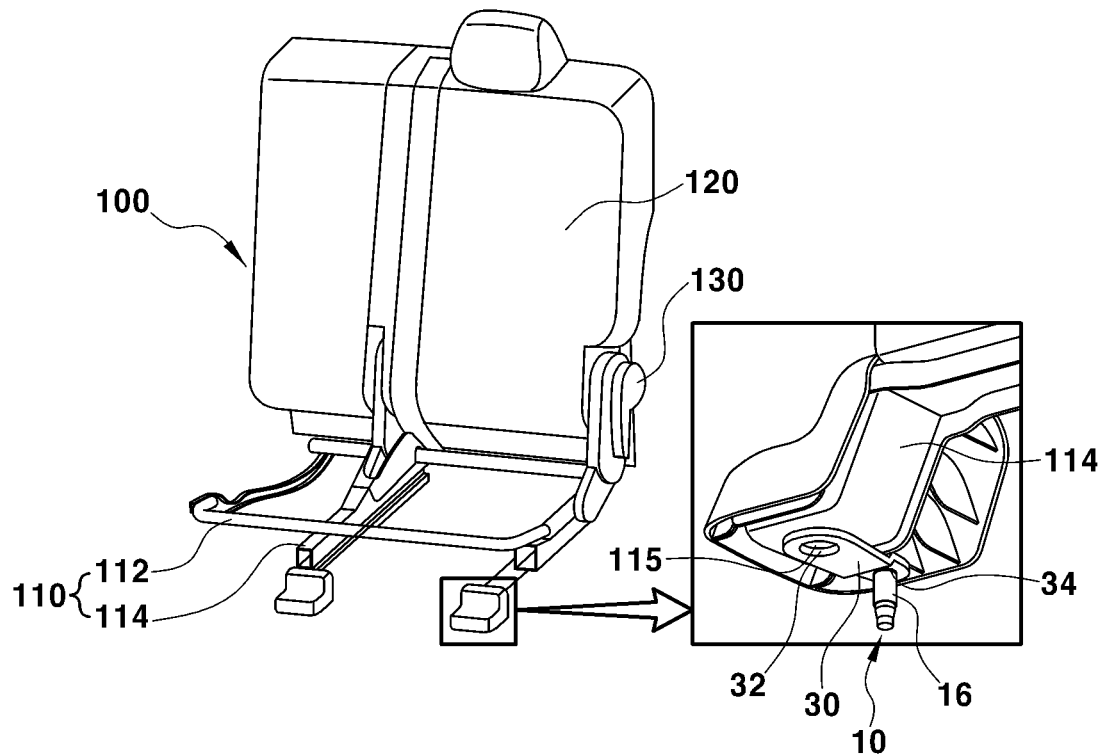
FIG. 1 is a perspective view illustrating the state in which a guide pin of a reclining seat assembly device for a vehicle according to the present disclosure is mounted to a mounting frame of a seat assembly.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Hereinafter, reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, preferred embodiments of the present disclosure will be described with reference to the accompanying drawings.

Figure 2:
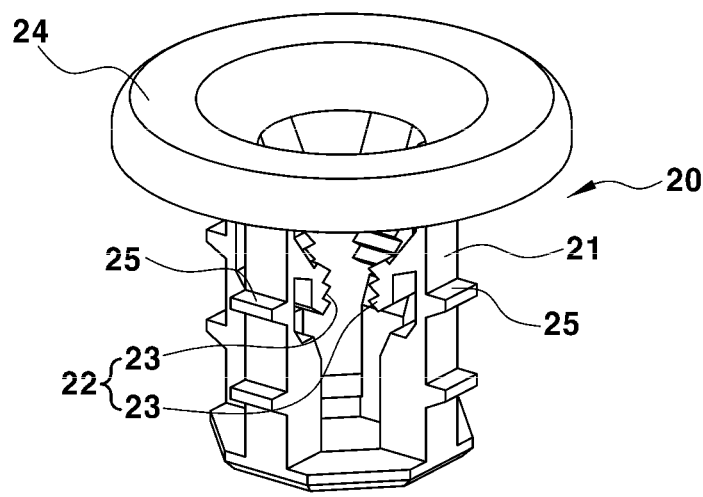
FIG. 2 is a perspective view illustrating a guide clip of a reclining seat assembly device for a vehicle according to the present disclosure.
Figure 3:
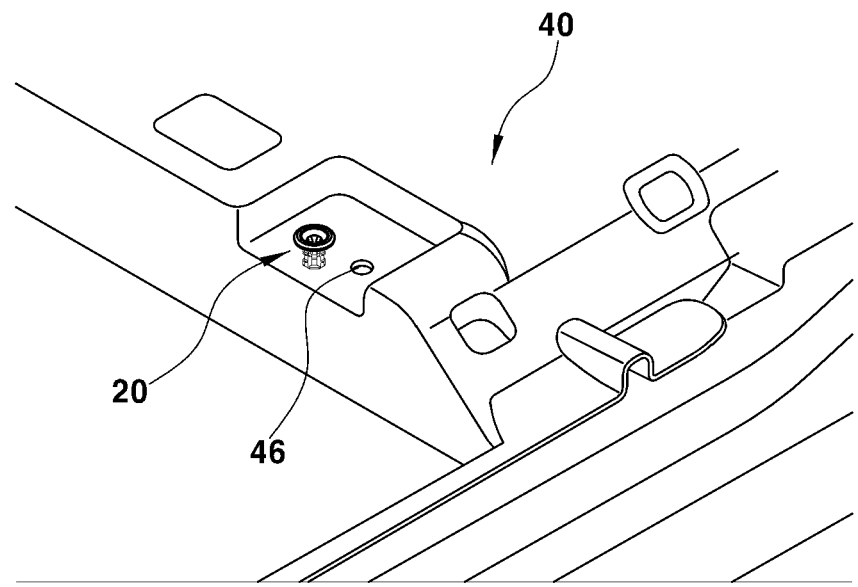
FIG. 3 is a schematic view illustrating a floor panel structure into which a guide clip of a reclining seat assembly device fora vehicle according to the present disclosure is mounted.

FIG. 1 is a perspective view illustrating the state in which a guide pin of a reclining seat assembly device for a vehicle according to the present disclosure is mounted to a mounting frame of a seat assembly, FIG. 2 is a view illustrating a guide clip of a reclining seat assembly device for a vehicle according to the present disclosure, and FIG. 3 illustrates a floor panel structure into which a mounting frame and a guide clip are mounted.

Referring to FIG. 1, a reclining seat assembly 100 may include a leg unit 110 and a seatback 120 foldably and reclinably connected to the leg unit 110.

Additionally, the leg unit 110 may include a support frame 112 configured to mount a seat cushion thereon and a mounting frame 114 mounted to a floor panel in an interior of a vehicle.

In addition, a recliner lever 130 configured to fold or recline the seatback may be mounted on a side portion of the seatback 120.

In particular, the mounting frame 114 may be equipped with a guide pin 10 to primarily temporarily assemble the reclining seat assembly at a predetermined position on the floor panel (the position at which the seat assembly is to be mounted).

Here, the lower surface of the mounting frame 114 may be provided with a washer member 30 mounted thereon, the washer member 30 having therein a through hole 32 that matches a mounting hole 115 in the mounting frame 114 and a fixing hole 34 formed to be separated from the through hole 32 by a predetermined distance and into which the guide pin 10 is fixedly inserted.

Accordingly, the guide pin 10 may be substantially fixedly inserted into the fixing hole 34 in the washer member 30.

A heat-shrink tube 16, onto which a locking structure 22 of a guide clip 20 is press-fitted and thus locked, may cover an outer surface of the guide pin 10, as will be described later.

According to the present disclosure, the guide clip 20 made of a plastic material into which the guide pin 10 may be lockably inserted is mounted in the floor panel 40 first.

To this end, as illustrated in FIG. 2, the guide clip 20 may include a guide pipe 21 provided in a structure in which the locking structure 22 is formed on an inner surface thereof so as to be inserted into a guide hole 42 in the floor panel 40, and a flange 24 integrally formed with a front end portion of the guide pipe 21 so as to be caught by an upper surface portion of the floor panel 40 and seated thereon.

A plurality of locking structures 22 may be formed on an inner surface of the guide pipe 21 in circumferential and vertical directions at predetermined intervals, wherein each of the locking structures 22 is formed in a sawtooth-shaped structure 23 protruding downwards from the inner surface of the guide pipe 21 so as to be closely adhered to an outer surface of the guide pin 10.

Accordingly, when the guide pin 10 is inserted in the guide pipe 21 of the guide clip 20, the sawtooth-shaped structure 23 of the locking structure 22 may be closely adhered to the outer surface of the guide pin 10 to lock the guide pin 10, thereby preventing the guide pin 10 from becoming separated from the guide clip 20.

Furthermore, since the heat-shrink tube 16 covers the outer surface of the guide pin 10, the sawtooth-shaped structure 23 of the locking structure 22 may be pressed into the heat-shrink tube 16 to lock the guide pin 10, whereby escape of the guide pin 10 from the guide clip 20 is more easily prevented.

Meanwhile, a plurality of escape prevention protrusions 25 to be compressed on an inner surface of the guide hole 42 in the floor panel 40 may be formed to protrude from an outer surface of the guide pipe 21 of the guide clip 20 at predetermined intervals in circumferential and vertical directions.

Referring to FIG. 3, the floor panel 40 may have formed therein the guide hole 42, into which the guide clip 20 is coupled, and an assembly hole 46, formed right next to the guide hole 42 and into which the mounting frame 114 of the leg unit 110 is mounted.

Accordingly, when the guide pipe 21 of the guide clip 20 is inserted into the guide hole 42 in the floor panel 40, the escape prevention protrusions 25 may be closely adhered to the inner surface or a lower surface of the guide hole 42 so as to be locked thereto, and thus escape of the guide clip 20 from the guide hole 42 in the floor panel 40 may be easily prevented.

Here, a process of assembling the reclining seat using the reclining seat assembly device having the above-described configuration according to the present disclosure is as follows.

FIGS. 4 to 7 are views sequentially illustrating the process of assembling the reclining seat with the reclining seat assembly device according to the present disclosure.

Figure 4:
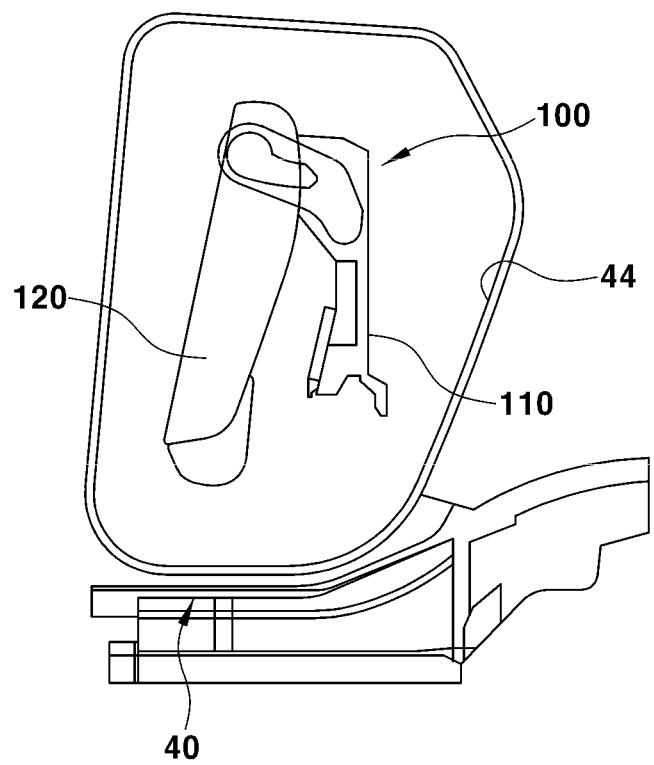
FIGS. 4 to 6 are views sequentially illustrating a process of assembling a reclining seat with a reclining seat assembly device for a vehicle according to the present disclosure.

First, as illustrated in FIG. 4, the guide clip 20 may be mounted in the floor panel 40.

That is, because the guide hole 42 and the assembly hole 46 are formed at predetermined positions on the floor panel 40, the guide clip 20 may be first mounted in the guide hole 42.

Figure 5:
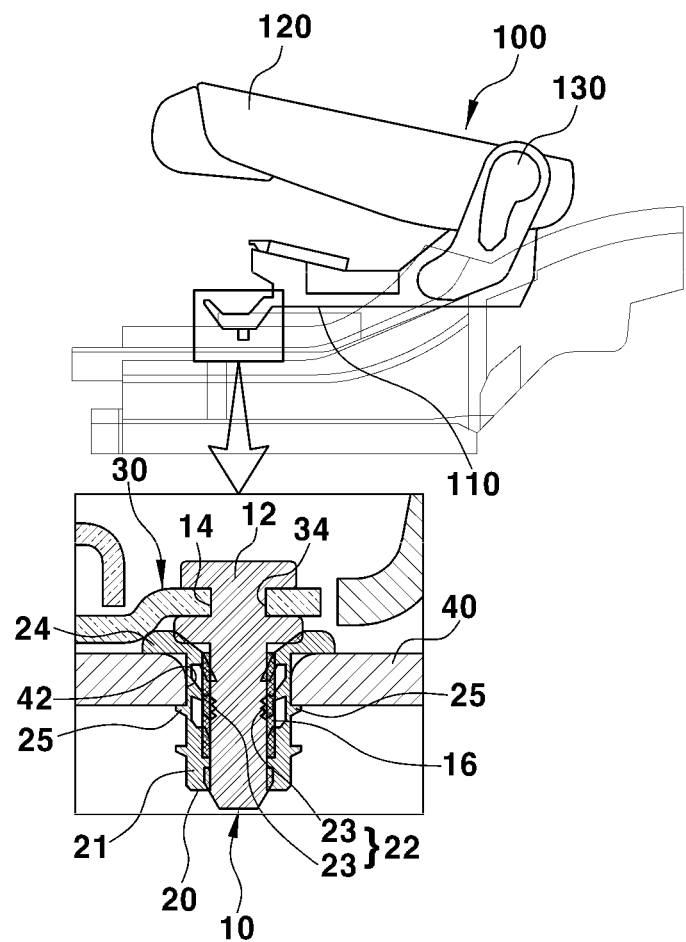

Next, as illustrated in FIG. 5, the reclining seat assembly 100 with the seatback 120 folded on the leg unit 110 may be placed in the interior of a vehicle through a door opening 44 in a vehicle body before assembling a vehicle door, after which the reclining seat assembly 100 is assembled to the floor panel in the vehicle.

In more detail, when the seatback 120 is unfolded from the leg unit 110 and reclined, the reclining seat assembly 100 cannot pass through the door opening 44 in the vehicle body. For this reason, the reclining seat assembly 100 is received from a seat manufacturer in the state in which the seatback 120 is folded on the leg unit 110, so that a worker can easily place the reclining seat assembly 100 in the interior of the vehicle through the door opening 44 in the vehicle body.

Next, the seat assembly 100 may be placed at the predetermined position on the floor panel 40 (the position where the seat assembly is to be mounted) and the guide pin 10 mounted on the mounting frame 114 may be inserted in the guide clip 20, which has been pre-inserted into the floor panel 40 so as to allow the guide pin 10 to be locked using the locking structure 22 of the guide clip 20. And therefore, the seat assembly 100 is placed at the predetermined position on the floor panel 40 and is primarily temporarily assembled thereto, as illustrated in FIG. 6.

Figure 6:
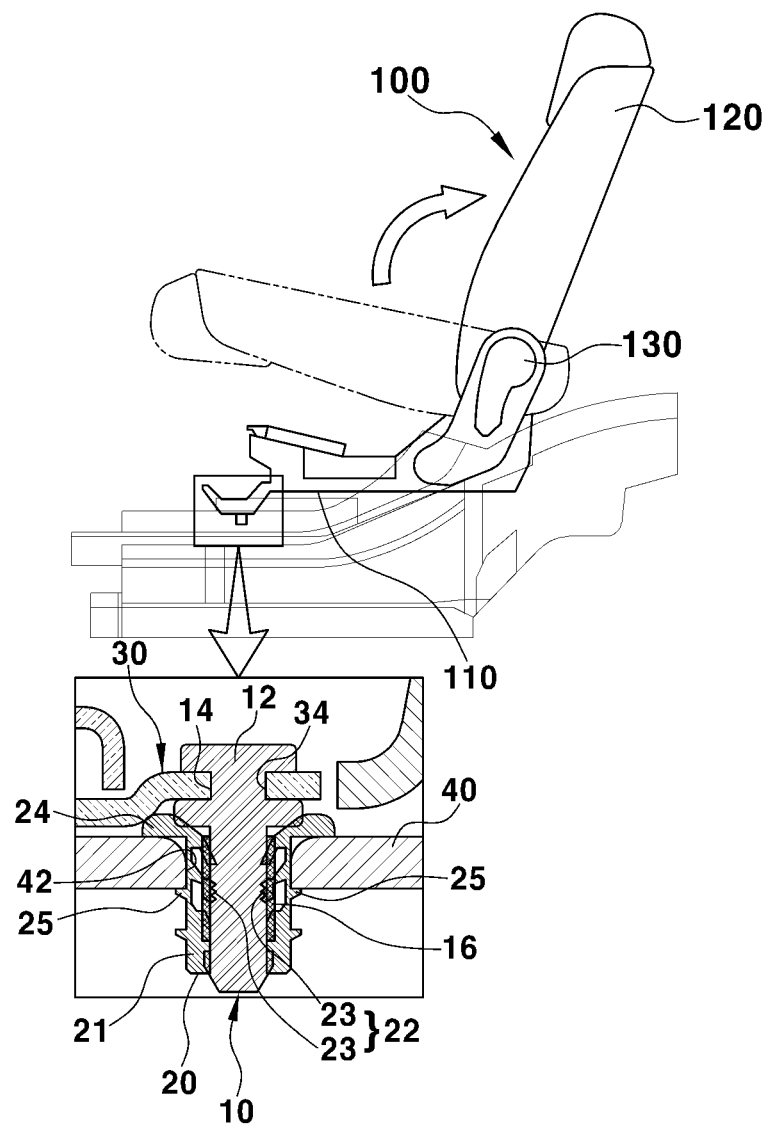

As illustrated in the enlarged view of FIG. 6, when the guide clip 20 is pre-inserted into the guide hole 42 in the floor panel 40, the escape prevention protrusions 25 formed on the outer surface of the guide pipe 21 may be closely adhered to the inner surface or the lower surface of the guide hole 42 so as to be locked thereto, and thus the guide clip 20 is prevented from being separated from the guide hole 42 in the floor panel 40.

In addition, the guide pin 10 may be substantially fixedly inserted into the fixing hole 34 in the washer member 30 mounted on the lower surface of the mounting frame 114.

That is, after an inner circumferential end portion of the fixing hole 34 in the washer member 30 is inserted into a fixing groove 14 formed in the circumferential surface of a head 12 of the guide pin 10, the head 12 of the guide pin 10 may be fixedly inserted into the fixing hole 34 in the washer member 30 mounted on the lower surface of the mounting frame 114.

Accordingly, when the guide pin 10 is inserted into the guide pipe 21 of the guide clip 20 pre-inserted into the floor panel 40, the sawtooth-shaped structure 23 of the locking structure 22 may be closely adhered to the outer surface of the guide pin 10 to thereby lock the guide pin 10, so the guide pin 10 is prevented from being separated from the guide clip 20, and the seat assembly 100 may be placed at the predetermined position on the floor panel 40 so as to be primarily temporarily assembled thereto.

Furthermore, the sawtooth-shaped structure 23 of the locking structure 22 may be pressed into the heat-shrink tube 16 covering the outer surface of the guide pin 10 to lock the guide pin 10, as illustrated in FIG. 6, and therefore escape of the guide pin 10 from the guide clip 20 is more easily prevented.

Next, the seatback 120 folded onto the leg unit 110 may be reclined to be erected.

That is, the worker may manipulate the recliner lever 130 provided on the side portion of the seat assembly 100 in an unlocking direction to recline the seatback 120.

Since the seatback 120 folded on the leg unit 110 covers the mounting hole 115 formed in the mounting frame 114 of the leg unit 110, the seatback 120 may be reclined to allow the worker to easily access the mounting hole 115 with a tool.

Here, in the existing technology, when manipulating the recliner lever 130 in the unlocking direction to recline the seatback 120, the leg unit 110 may be moved and lifted upwards due to the rearward rotation moment of the seatback 120. However, in the present disclosure, since the guide pin 10 mounted on the mounting frame 114 is inserted into the guide clip 20, which is pre-inserted into the floor panel 40, so as to be locked by the locking structure 22, a phenomenon such as the leg unit 110 being moved or lifted up can be easily prevented, and accordingly, the seat assembly 100 can be maintained fixed in the predetermined position on the floor panel 40 (the position at which the seat assembly is mounted).

In other words, the sawtooth-shaped structure 23 of the locking structure 22 formed on the inner surface of the guide clip 20 may be pressed into the heat-shrink tube 16 covering the outer surface of the guide pin 10 to keep the guide pin 10 locked, as illustrated in the enlarged view of FIG. 7, and as such, escape of the guide pin 10 from the guide clip 20 may be prevented when the recliner lever 130 is manipulated in the unlocking direction to recline the seatback 120 rearwards. Accordingly, a phenomenon such as the leg unit 110 being moved or lifted upwards can be easily prevented, thereby allowing the seat assembly 100 to be maintained in a fixed state at the predetermined position on the floor panel 40 (the position at which the seat assembly is mounted).

Then, the worker may insert a bolt or the like into the assembly hole 46 in the floor panel 40 through the mounting hole 115 in the mounting frame 114 of the leg unit 110 and the through hole 32 in the washer member 30, and, as such, the leg unit 110 may be firmly assembled to the floor panel 40 without a gap therebetween, owing to the washer member 30.

Meanwhile, after the bolt is fastened through the mounting hole 115 in the mounting frame 114, the mounting hole 115 into which the bolt may be fastened is covered by the mounting cover 116 so as to improve the external appearance thereof.

Finally, a seat cushion (not illustrated) on which a passenger is seated may be assembled on the support frame 112 of the leg unit 110.

As described above, as the guide pin 10 mounted on the mounting frame 114 of the leg unit 110 in the configuration of the reclining seat assembly 100 is inserted into the guide clip 20 mounted in the floor panel 40 so as to be locked therein, the reclining seat assembly 100 may be prevented from deviating from the predetermined position (the position at which the seat assembly is mounted) on the floor panel 40 during the assembly process. This allows subsequent processes for assembling the reclining seat to be smoothly carried out, thereby reducing labor for assembling the reclining seat and greatly improving assembly workability.

As is apparent from the above description, the present disclosure provides the following effects.

First, because a guide pin mounted on a mounting frame of a leg unit that constitutes a reclining seat assembly is inserted into a guide clip that is fixedly inserted in a floor panel so as to be locked therein, the guide pin can be prevented from becoming separated from the guide clip during reclining of a seatback for assembly of a reclining seat.

Second, since the guide pin mounted on the mounting frame of the leg unit is inserted into the guide clip and kept locked therein, the reclining seat assembly is prevented from deviating from a predetermined position (the position where the seat assembly is mounted) on the floor panel. Accordingly, subsequent processes for assembling the reclining seat, such as inserting a bolt into the floor panel through a mounting hole in a mounting frame, can be smoothly carried out, thereby reducing labor for assembling the reclining seat and greatly improving assembly workability.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and equivalents thereto.

What is claimed is:

1. A reclining seat assembly for a vehicle, the seat assembly comprising:

a) a leg unit comprising a support frame for mounting a seat cushion and a mounting frame,
b) a seatback reclinably connected to the leg unit,
c) a guide clip comprising a locking structure, the guide clip mounted in a guide hole in a vehicle floor panel; and
d) a guide pin mounted to the mounting frame and inserted into the guide clip to allow the guide pin to be locked by the locking structure;
wherein, in a state where the guide pin mounted on the mounting frame is inserted into the guide hole, the guide pin is prevented from being separated from the guide hole during reclining of the seatback while the reclining seat is assembled to the floor panel.

2. The reclining seat assembly of claim 1, wherein the guide clip comprises:
a guide pipe provided in a configuration in which the locking structure is formed on an inner surface of the guide pipe configured so as to be inserted into the guide hole in the floor panel; and
a flange integrally formed with a top of the guide pipe so as to be caught by an upper surface portion of the floor panel and seated thereon.

3. The reclining seat assembly device of claim 2, wherein the locking structure is formed in a sawtooth-shaped structure protruding downwards from the inner surface of the guide pipe so as to be closely adhered to an outer surface of the guide pin.

4. The reclining seat assembly device of claim 3, wherein the outer surface of the guide pin is covered by a heat-shrink tube onto which the locking structure is press-fitted and thus locked.

5. The reclining seat assembly device of claim 4, wherein the sawtooth-shaped structure of the locking structure is pressed into the heat-shrink tube to lock the guide pin, so that the guide pin is constrained in the guide clip and the leg unit of the seat assembly is fixed when the seatback is reclined.

6. The reclining seat assembly device of claim 2, wherein an outer surface of the guide pipe is formed with an escape prevention protrusion.

7. The reclining seat assembly device of claim 6, wherein when the guide pipe of the guide clip is inserted into the guide hole in the floor panel, the escape prevention protrusion is closely adhered to the inner surface of the guiding hole so as to be locked thereto.

8. The reclining seat assembly device of claim 1, wherein the mounting frame is further provided with a washer member mounted on a lower surface thereof, the washer member having therein a through hole that matches a mounting hole in the mounting frame and a fixing hole formed to be separated from the through hole by a predetermined distance and into which the guide pin is fixedly inserted.

9. The reclining seat assembly device of claim 8, wherein a circumferential surface of a head of the guide pin is formed with a fixing groove, into which an inner circumferential end portion of the fixing hole in the washer member is inserted.

10. The reclining seat assembly device of claim 8, wherein the mounting hole is covered by a mounting cover after the floor panel is bolted through the mounting hole and the through hole in the mounting frame.

11. The reclining seat assembly device of claim 2, wherein the flange is integrally formed with a front end portion of the guide pipe.

12. The reclining seat assembly device of claim 1, wherein the seat cushion is assembled on a support frame.

13. The reclining seat assembly device of claim 1, wherein a recliner lever configured to fold or recline the seatback is mounted on a side portion of the seatback.

14. The reclining seat assembly device of claim 1, wherein the guide clip is made of a plastic material.

15. A vehicle comprising the reclining seat assembly device of claim 1.

16. A vehicle comprising a reclining seat assembly for a vehicle, the seat assembly comprising:
a) a leg unit comprising a support frame for mounting a seat cushion and a mounting frame,
b) a seatback reclinably connected to the leg unit, and
c) a guide clip comprising a locking structure, the guide clip mounted in a guide hole in a vehicle floor panel; and
d) a guide pin mounted to the mounting frame and inserted into the guide clip to allow the guide pin to be locked by the locking structure;
wherein, in a state where the guide pin mounted on the mounting frame is inserted into the guide hole, the guide pin is prevented from being separated from the guide hole during reclining of the seatback while the reclining seat is assembled to the floor panel.

17. A device for assembling a reclining seat for a vehicle, comprising:
a) a leg unit comprising a support frame for mounting a seat cushion and a mounting frame,
b) a seatback reclinably connected to the leg unit,
c) a guide clip comprising a locking structure, the guide clip mounted in a guide hole in a vehicle floor panel; and
d) a guide pin mounted to the mounting frame and inserted into the guide clip to allow the guide pin to be locked by the locking structure;
wherein, in a state where the guide pin mounted on the mounting frame is inserted into the guide hole, the guide pin is prevented from being separated from the guide hole during reclining of the seatback while the reclining seat is assembled to the floor panel.

* * * * *